United States Patent [19]

Schmidt

[11] Patent Number: 5,760,579
[45] Date of Patent: Jun. 2, 1998

[54] CONTACTLESS ELECTRICAL MEASUREMENT DEVICE INCLUDING A MAGNETIZABLE PLASTIC COIL BODY FOR A CURRENT-CARRYING COIL

[75] Inventor: Klaus Schmidt, Moeglingen, Germany

[73] Assignee: Robert Bosch GmbH, Stuttgart, Germany

[21] Appl. No.: 69,931

[22] Filed: May 28, 1993

[30] Foreign Application Priority Data

Jul. 30, 1992 [DE] Germany ............... 42 25 172.9

[51] Int. Cl.$^6$ ................. G01B 7/14; G01R 33/00; H01F 27/24
[52] U.S. Cl. ................. 324/234; 324/207.16; 336/233
[58] Field of Search ................. 324/207.11, 207.13, 324/207.16, 174, 228, 239, 206, 262; 336/233

[56] References Cited

U.S. PATENT DOCUMENTS

| | | | |
|---|---|---|---|
| 4,024,484 | 5/1977 | Tomczak et al. | 324/207.16 |
| 4,256,986 | 3/1981 | Anderson | 324/174 |
| 5,239,204 | 8/1993 | Mueller et al. | 324/207.16 |

*Primary Examiner*—Walter E. Snow
*Attorney, Agent, or Firm*—Michael J. Striker

[57] ABSTRACT

The measurement device for generating a measurement signal from an object without physical contact with the object includes a magnetizable plastic coil body and at least one coil arranged on the coil body and through which a current flows during generation of the measurement signal. The coil body can be part of a one-piece injection molded plastic part consisting of a magnetizable plastic material. In a preferred embodiment the one-piece injection molded magnetizable plastic part consists of ring-like mounting element and a sleeve-like extension with a exterior circumferential groove for the coil or coils which acts as the magnetizable plastic coil body. The magnetizable plastic substance can be a polyamide plastic substance filled with a weakly magnetizable material such as an iron-cobalt powder.

6 Claims, 1 Drawing Sheet

CONTACTLESS ELECTRICAL MEASUREMENT DEVICE INCLUDING A MAGNETIZABLE PLASTIC COIL BODY FOR A CURRENT-CARRYING COIL

BACKGROUND OF THE INVENTION

The present invention relates to measurement device for generating an electrical measurement signal from an object without direct contact between the object and the measurement device.

A measurement device of this type is known comprising a coil body and at least one coil having current flowing through it and arranged on the coil body. For example, an object to be detected is moved relative to the coil body and/or the coil and the measurement device produces a signal as a result.

In a sensor currently used in practice the coil core is made from a metallic material and is injection molded to a mounting element with the aid of an inserted body in an injection mold or die or alternatively is snapped on it. To insulate the coil wound on the coil body the coil body is coated with a powdery lacquer on its inside, i.e. on the side facing the coil. Because of that, several steps are necessary during assembly of the measurement device.

SUMMARY OF THE INVENTION

It is an object of the present invention to provide a measurement device of the above-described type for contactless generation of a measurement signal from an object, which does not have the above-described disadvantage.

It is also an object of the present invention to provide a measurement device of the above-described type for generation of a measurement signal from an object without physical contact with the object, in which the measurement device includes at least one coil arranged on a coil body which requires no inserted body in the injection mold or die for formation of the coil body.

These objects and others which will be made more apparent hereinafter are attained in a sensor comprising a coil body and at least one coil arranged on the coil body through which current flows during detection of the body.

According to the invention, the coil body is a magnetizable plastic body consisting of a magnetizable plastic substance.

The required individual parts of the measuring device or sensor can be reduced by a suitable selection of material for the coil body. By appropriate selection of materials according to the invention there is no need to provide an electrically insulating coating on the coil body. By reducing the components of the sensor and shortening the mounting time a more economical sensor results. Furthermore the signal produced by the sensor is hardly impaired at all in the device of the invention.

Because the coil body consists of a magnetizable plastic material, the coil body can be a one-piece injection molded magnetizable plastic part or advantageously part of a one-piece injection molded magnetizable plastic part whose other parts are useful for mounting purposes.

Thus the coil body can be part of a mounting element used to attach the measurement device to a part of a vehicle, for example a shock absorber.

In a preferred embodiment the coil body consists of polyamide plastic substance filled with weakly magnetizable material (e.g. Fe48Co2V powder with a grain size of 60 to 90 microns).

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
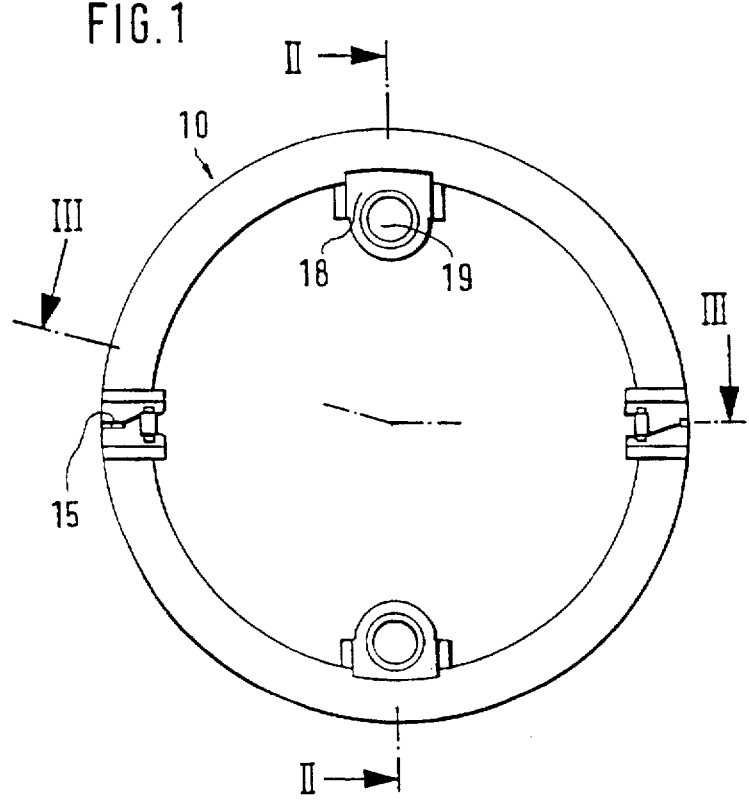
FIG. 1 is a plan view of a measurement device according to the invention with the object being measured.
Figure 2:
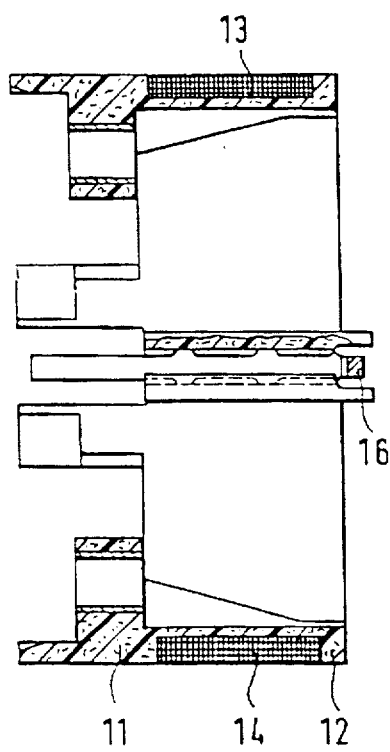
FIG. 2 is a longitudinal cross-sectional view of the measurement device of FIG. 1 along the section line II—II of FIG. 1.
Figure 3:
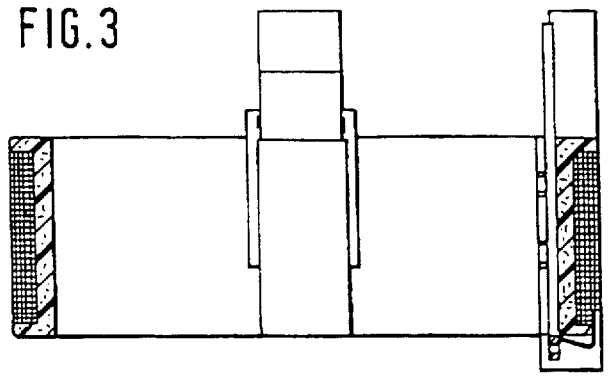
FIG. 3 is another cross-sectional view of the measurement device of FIG. 1 along the section line III—III of FIG. 1.

A measurment device 10 is shown in FIG. 1, which comprises a one-piece injection molded magnetizable plastic part. It includes a ring-like mounting element 11, from which a sleeve-like extension 12 comprising the coil body extends. The extension 12 has on its outer side a circumferential groove 13, in which at least one coil 14 is arranged. A multilayer coil is shown in the drawing, whose wire ends 15, as shown in FIG. 2 and/or FIG. 3, are connected with plug contacts 16.

The mounting element 11 has two diametrically opposite flange-like protrusions 18, in each of which a passage 19 is formed, with whose aid the measurement device 10 is mounted on an unshown component, for example a shock absorber, whose motion can be determined.

The mounting element 11 and the extension 12 are portions of the one-piece injection molded magnetizable plastic piece and the circumferential groove 13 is formed directly in the injection molding process. A magnetizable plastic material, e.g. 90% by weight iron-cobalt powder and 10% by weight polyamide 6 (6: standard strength), is used as the injection molding material which forms the one-piece injection molded magnetizable plastic piece. The metallic component advantageously can be a metal powder consisting of Fe48Co2V powder having a grain size of 60 to 90 micrometers and also a bimodal mixture of 30% by weight Fe35Co2V powder with a grain size of about 9 micrometers and 70% by weight Fe48Co2V powder with a grain size of greater than 90 micrometers. Bimodal spherical iron powder is also conceivable as the metallic component.

The measurement device, which produces a detection signal in response to an object in its vicinity, can operate by different physical principles. An object, whose longitudinal motion is to be detected, is moved relative to the coil through which current flows. For example, an eddy current method can be used, in which eddy currents are produced in an object made of an electrically conductive material, which changes the inductance of the sensor coil. Also the sensor can operate according to a transformer principle, in which a primary coil through which current flows initially is provided and a secondary coil in which a voltage is induced are both mounted on the coil body.

It will be understood that each of the elements described above, or two or more together, may also find a useful application in other types of structures differing from the types described above.

While the invention has been illustrated and described as a measurment device for contactless detection of-an object, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

I claim:

1. A measurement device for producing an electrical measurement signal from an object without contacting the object physically, said measurement device comprising a one-piece injection molded magnetizable plastic part, said plastic part including a magnetizable plastic coil body, and at least one coil arranged on the magnetizable plastic coil body and through which an electric current flows during production of the electrical measurement signal, wherein said one-piece injection molded magnetizable plastic part consists of a polyamide plastic substance filled with a weakly magnetizable material and said weakly magnetizable material is a Fe48Co2V powder having a grain size of 60 to 90 microns.

2. A measurement device for producing an electrical measurement signal from an object without contacting the object physically, said measurement device comprising a one-piece injection molded magnetizable plastic part, said plastic part including a magnetizable plastic coil body, and at least one coil arranged on the magnetizable plastic coil body and through which an electric current flows during production of the electrical measurement signal, wherein said one-piece injection molded magnetizable plastic part consists of a polyamide plastic substance filled with a weakly magnetizable material and said weakly magnetizable material is a bimodal mixture of 30% by weight Fe35Co2V powder with a grain size of about 9 micrometers and 70% by weight Fe48Co2V powder with a grain size of greater than 90 micrometers.

3. A measurement device for generating a measurement signal from an object without physical contact with the object, said measurement device comprising a one-piece injection molded magnetizable plastic part consisting of a mounting element and an extension of said mounting element acting as coil body for at least one coil, wherein said one-piece injection molded magnetizable plastic part consists of a plastic substance filled with a weakly magnetizable material and said mounting element has means for mounting said plastic part, and wherein said weakly magnetizable material is a Fe48Co2V powder having a grain size of 60 to 90 microns.

4. A measurement device for generating a measurement signal from an object without physical contact with the object, said measurement device comprising a one-piece injection molded magnetizable plastic part consisting of a mounting element and an extension of said mounting element acting as coil body for at least one coil, wherein said one-piece injection molded magnetizable plastic part consists of a plastic substance filled with a weakly magnetizable material and said mounting element has means for mounting said plastic part, and wherein said weakly magnetizable material is a bimodal mixture of 30% by weight Fe35Co2V powder with a grain size of about 9 micrometers and 70% by weight Fe48Co2V powder with a grain size of greater than 90 micrometers.

5. The measurement device as defined in claim 3, wherein said extension is sleeve-like and has an exterior circumferential groove accommodating said at least one coil and said mounting element is ring-like.

6. The measurement device as defined in claim 4, wherein said extension is sleeve-like and has an exterior circumferential groove accommodating said at least one coil and said mounting element is ring-like.

* * * * *